Inventor:
George B. Hirsch,
by Maxwell Fish
Attorney

Sept. 29, 1959 G. B. HIRSCH 2,906,355
VEHICLE CURB PARKING DEVICE
Filed Oct. 1, 1954 3 Sheets-Sheet 3

Inventor:
George B. Hirsch,
by Maxwell Fish
Attorney

United States Patent Office 2,906,355
Patented Sept. 29, 1959

2,906,355

VEHICLE CURB PARKING DEVICE

George B. Hirsch, Providence, R.I.

Application October 1, 1954, Serial No. 459,709

7 Claims. (Cl. 180—1)

The present invention relates to a vehicle curb parking device.

It is an object of the present invention to provide a vehicle curb parking device for use with automotive vehicles which will permit such a vehicle to be parked quickly and efficiently in a minimum parking space at the curb. One phase of vehicle operation which drivers find most difficult is the problem of moving a car efficiently and accurately into a parking space at a curb where space for maneuvering is limited to a minimum by the presence of other parked cars.

It is another object of the invention to provide means for the assistance of the operator in moving a car efficiently and accurately into such a space at the curb.

In accordance with the invention a vehicle curb parking device is provided which may be readily actuated by the operator and which acts while the car is being backed into the space to automatically control the steering wheels so that the car is moved accurately into its allotted space.

The several features of the invention will be readily understood from the following description taken in connection with the accompanying drawings, in which Fig. 1 is a perspective view of the automobile chassis to which my curb parking device has been applied;

Figure 1:
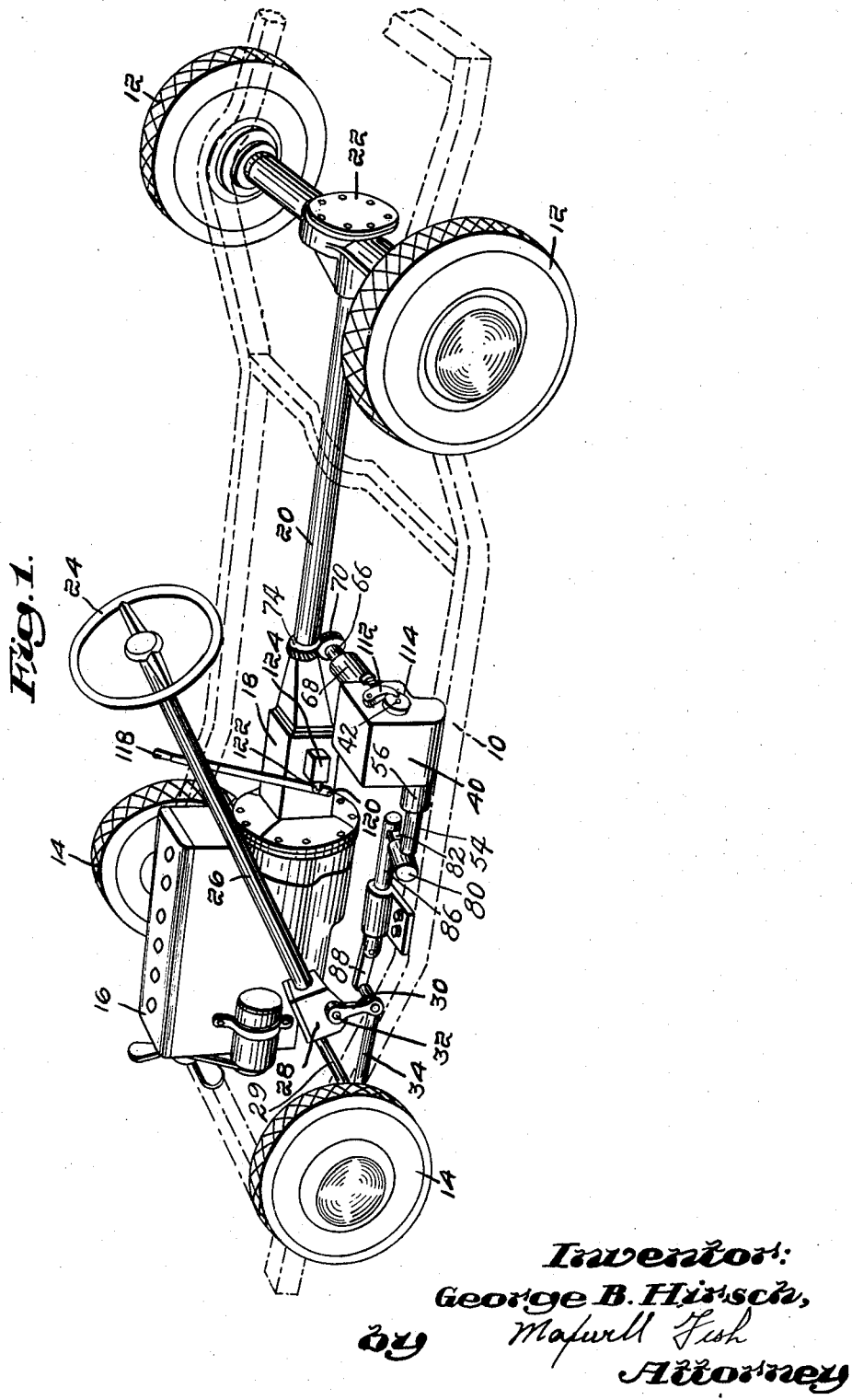

The parking device which forms the subject matter of the present invention comprises generally a casing in which is supported a parking control cam and a cam follower, the parking control cam being connected through a normally disconnected coupling with the drive transmission shaft to the rear driving wheels of the vehicle, and the follower being connected by means of a second disconnectable coupling with the steering apparatus of the vehicle. The mechanism through which the cam is driven includes a one-direction driving clutch which permits the parking device to become operative only when the vehicle is moved in the reverse direction, and a main driving clutch which is arranged to be engaged only when the couplings with the machine drive and with the steering apparatus are engaged.

In the illustrated form of the device the elements of the parking device are supported in a housing which is pivotally mounted on the chassis of a vehicle so that a swinging movement of the housing will bring both the cam connected coupling and the follower connected coupling to their engaged positions. In the illustrated form of the invention shown a manually operated hydraulic device is provided which acts when actuated to shift the cam clutch to its closed position and thereafter to swing the housing about its pivot to engage the couplings referred to so that the device becomes operative upon movement of the vehicle in the reverse direction to move the steering wheels in accordance with a predetermined pattern to park a car.

Referring specifically to the drawings, an automobile chassis which may be of ordinary description is shown including a frame 10, rear driving wheels 12, front steering wheels 14, motor 16, transmission box 18 and a power shaft housing 20 connected by means of the usual differential gear housing 22. A steering apparatus of ordinary description is shown including the steering wheel 24, a steering post 26 housing a steering rod 27, a steering gear box 28 and a tie rod 29. A downwardly extending lever arm 30 secured to an output shaft 32 from the steering gear box 28 is connected by a link 34 with the usual front wheel steering system not specifically shown.

The vehicle curb parking device which forms more specifically the subject matter of the invention comprises a casing 40 pivotally supported for movement between an operative and an inoperative position on a shaft 42 supported at its two ends in downwardly extending flanges 44 of a laterally disposed frame member 46. At one end the frame member is secured to the transmission gear housing 18 and at its other end to one of the longitudinal elements of the chassis frame 10 (see Figs. 2 and 3).

Figure 2:
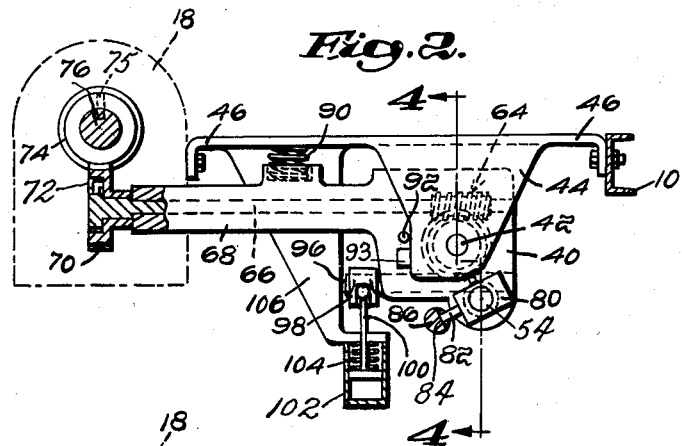
Fig. 2 is a view of the device shown in Fig. 1 looking from the front of the machine, and with the propeller shaft, the spiral gear coupling and one-direction driving clutch shown in section, the curb parking device being shown in Fig. 2 in its engaged position.
Figure 3:
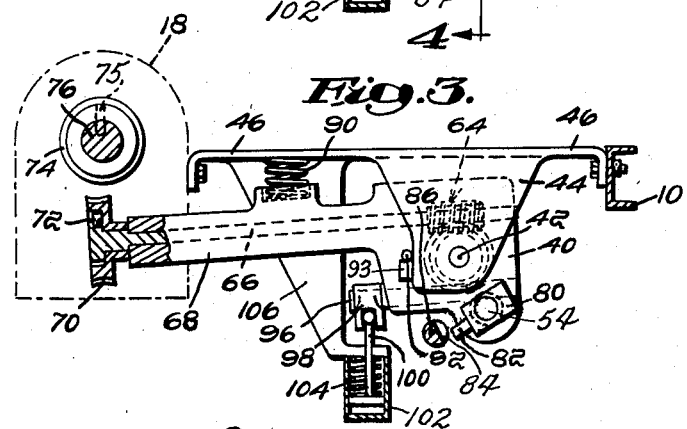
Fig. 3 is a view similar to Fig. 2 but with the vehicle parking device shown in its disconnected position.
Figure 4:
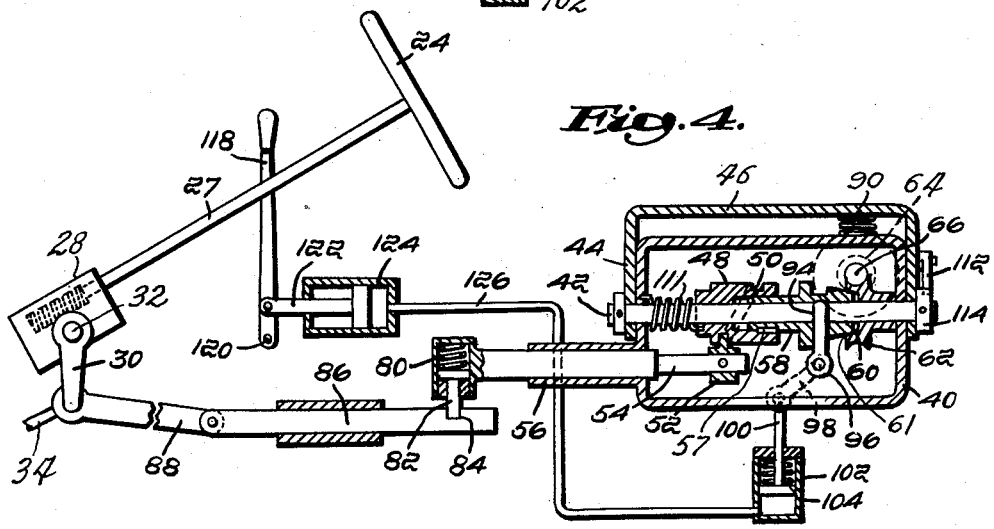
Fig. 4 is a sectional view taken on a line 4—4 of Fig. 2 to illustrate portions of the parking device including the coupling with the steering apparatus.

A parking control cam is provided in the form of a cylindrical member 48 which is loosely mounted to turn on the pivot shaft 42 and which has formed on its periphery a generally spiral cam track 50 to receive a follower member 52 mounted on a follower rod 54 axially shiftable in a sleeve support 56 forming part of the casing 40. The cam 48 is arranged to extend over and is keyed at 57 (Fig. 4) to turn with a sleeve member 58 which also has formed at the right hand end thereof, as shown in Fig. 4, a cone clutch element 60 adapted for engagement with a cone clutch face 61 (Fig. 4) formed in a worm gear 62 loosely supported to turn on the pivot shaft 42. The worm gear 62 is engaged by a worm 64 formed on a cross shaft 66 within a lateral extension 68 of the casing. At its outer end the shaft 66 carries a spiral gear 70 which is connected through an overrunning clutch 72 to turn the shaft 66. As shown in Figs. 2 and 3 the spiral gear 70 forms part of a normally disconnected coupling, the cooperating element of which is a spiral gear 74 fastened by a pin 75 (Figs. 2 and 3) to the propeller shaft 76 of the vehicle. The overrunning clutch 72 is so arranged that the coupling when rendered operative by the engagement of the two spiral gears 72, 74 acts to drive the cam cylinder 48 only when the vehicle is being driven in a reverse direction.

The cam follower rod 54, above referred to, is provided at its outer end with a housing 80 in which is mounted a laterally disposed spring pressed plunger 82 adapted for engagement with a notch 84 in an axially movable rod 86 which is in turn connected by a link 88 with a lever arm 30 of the steering apparatus above referred to. For the inoperative position of the device, specifically shown in Fig. 3, the cam follower coupling provided by the plunger 82 and notch 84 is disengaged by the removal of the plunger 82 from the notch 84.

The vehicle curb parking device is normally maintained in an inoperative position by means of a compression spring 90 seated at its lower end in a recess formed in the portion 68 of the housing 40, and at its upper end engaged against the underside of the frame member 46. The housing 40 is supported in the inoperative position to which it is swung by the pressure of spring 90, by means of a stop pin 92 mounted on the casing 40 for engagement against an abutment 93 on one of the flanges 44.

For rendering the parking device operative there is provided a clutch shifting fork 94 mounted on a pivot shaft 96 carried by the casing 40, and at its outer end provided with an arm 98 which is pivotally connected with the upper end of a hydraulically actuated plunger 100. The plunger is slidably supported in a housing 102 and is moved yieldably downwardly by means of a compression spring 104. As shown in Figs. 2 and 3 the housing 102 is supported from a downwardly extending flange 106 formed on the frame member 46. With the arrangement shown, the hydraulically operated plunger 100 will operate first to shift the clutch sleeve 58 and cone clutch element 60 to the right into engagement with the mating clutch element in the worm gear 62, thus operably connecting the cam cylinder 48 with the coupling gear member 70. Continued upward movement of the hydraulic plunger 100 now acts to swing the housing 40 about its pivot 42 so that the coupling members 70, 74 are engaged at the same time the coupling provided by spring pressed plunger 82 is moved from the inoperative position of Fig. 3 into its engaged position with slot 84 as shown in Fig. 2. In accordance with the invention the parking device is so arranged that the cam follower coupling 82, 84 will be engaged only in the event that the steering wheels 14 are in their neutral position since only for this position of the wheels will the slot 84 be aligned beneath the plunger 82.

The parking control cam 48 and the sleeve clutch 50 keyed thereto are normally maintained in a predetermined angular starting position by means of a torsion spring 111 (Fig. 4) coiled about the shaft 42 and connected at one end to the housing 40 and at its other end to the control cam 48. The spring tends to move these parts in a clockwise direction as shown in Figs. 2 and 3 to a stop position determined by the engagement of a spring pressed pawl 112, which is pivotally mounted from the housing 40, with a notched collar 114 fixed on the adjacent end of the rock shaft 42 (Figs. 1 and 4). It will be understood that the arrangement of the stop pawl 112 and of the cam track 50 and of the control cam 48 are such that if a backing movement of the vehicle by power is continued after the parking cycle is completed and with the parking device still engaged the parking cycle will merely start to repeat itself without other inconvenience or damage to the operating parts of the mechanism.

In the illustrated form of the device a manually operated control is provided for actuating the plunger 100 to throw the parking device into and out of operation which comprises a hand lever 118 pivoted at 120 on the transmission box 18 and connected intermediate its length with a plunger 122 of a hydraulic cylinder 124. A pipe line 126 connects the cylinder 124 with the lower end of the housing 40 in a closed hydraulic circuit.

Figure 5:
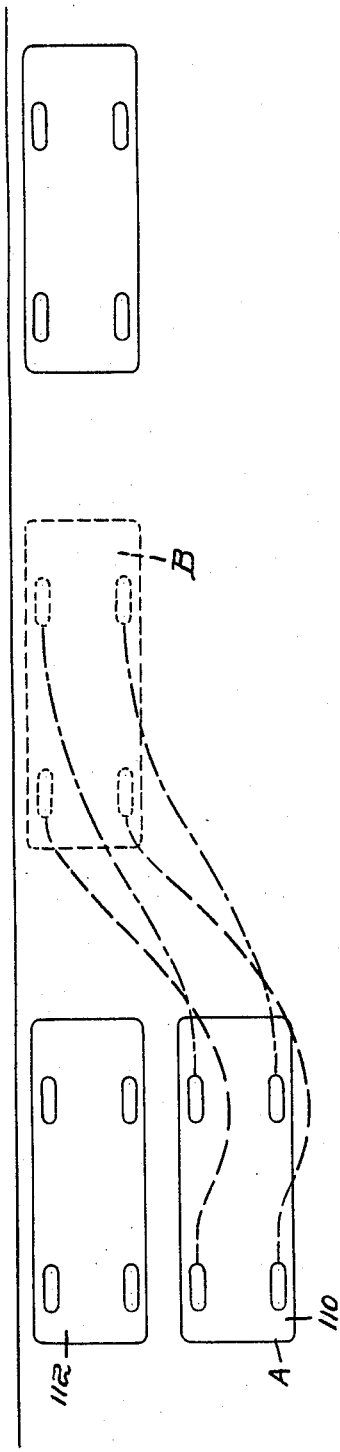
Fig. 5 is a diagrammatic view illustrating the manner in which the device operates to effect the backing of an automotive vehicle into a parked position at the curb.

In the operation of the device the vehicle, which is indicated in full lines at 110 in Fig. 5, is brought to a position A adjacent to and parallel to the next preceding vehicle 112 which bounds at its forward end the curb space into which the vehicle is to be moved. The steering wheels are now in the intermediate or straightened position in which the cam follower coupling above described consisting of the plunger 82 and notch 84 are aligned for engagement with one another. The operator next operates the plunger 100 by pulling on the hand lever 118, thus causing the plunger to be moved upwardly to engage the clutch 60, 62 and to swing the device with couplings 72, 74 and 82, 84 into their engaging positions. It will be noted that the parking control device remains operative only so long as the operator holds the hand lever 118. The operator has now only to back the automobile while the automatic steering control operates to steer the automobile accurately and into the waiting berth as shown at B in dotted lines in Fig. 5. When the vehicle has been brought into its desired position the vehicle is stopped and the operator operated control lever 118 by means of which the control plunger 100 was operated is released so that the plunger 100 is permitted to move the casing 40 downwardly under the influence of the spring unit 104 and spring 90 so that both the cam and cam follower couplings are disengaged and thereafter the clutch 60, 62 is similarly disengaged.

The parking control cam 48 now automatically under the influence of spring 111 returns in the opposite or clockwise direction as viewed in Figs. 2 and 3 to the initial starting position determined by engagement of the pawl 112 with the notch in the cam 114.

Figure 6:
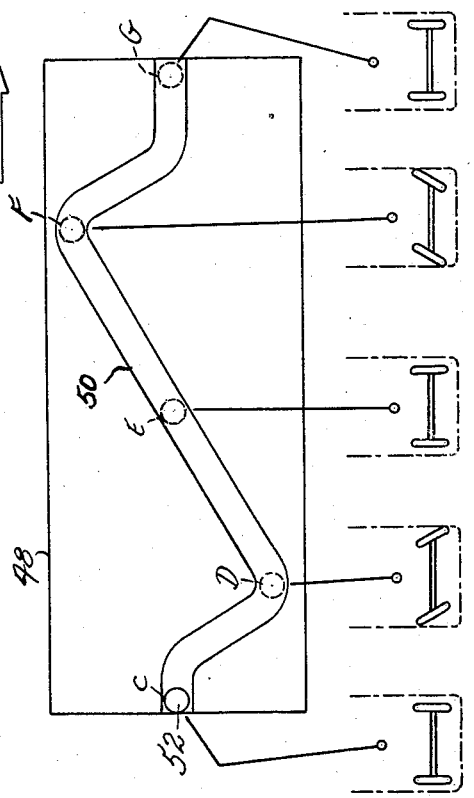
Fig. 6 is a developed view of the parking control cam, the corresponding positions of the steering wheels being shown for different positions of the follower during its travel along the length of the cam.

The cam contour illustrated in Fig. 6 controls in a preferred manner the operation of the steering wheels during the reversing cycle as shown in Fig. 5. The invention, however, is not limited to the specific contour shown. It will be understood, for example, that a shorter parking cycle may be employed in which no effort is made to return the steering wheels to their neutral intermediate position as the vehicle is brought into the curb. The invention in its broader aspects contemplates the use of a contour steering device in which means other than a mechanically acting contour cam is employed to control the steering operation during parking.

The invention having been described what is claimed is:

1. For use in an automotive vehicle having wheels including pivoted front steering wheels, and steering apparatus connected with said steering wheels, a vehicle curb parking device which comprises a cam supported from the vehicle contoured to impart steering movements to the steering wheels in accordance with a predetermined pattern, a cam follower supported from the vehicle and connected with the steering apparatus to shift said steering wheels between a neutral and left and right turn positions in accordance with said pattern, means connected to rotate with the wheels of the vehicle for driving the cam in timed relation to the motion rate of the wheels of the vehicle, said driving means including normally disconnected driving connections and one-way clutching means connected between the cam and said wheels for driving the cam always in one direction, said cam contour pattern being constructed to move the cam follower and the front steering wheels shifted thereby in accordance with a predetermined cycle of backing movement of the vehicle between a position substantially parallel to and removed from the curb and a rearwardly disposed position adjacent the curb, and means under the control of the operator for rendering said parking device operative including means for engaging said driving connection.

2. For use in an automotive vehicle having wheels including pivoted front steering wheels, and steering apparatus connected with said steering wheels, a vehicle curb parking device which comprises a cam supported from the vehicle contoured to impart steering movements to the steering wheels in accordance with a predetermined pattern, a cam follower supported from the vehicle and connected with the steering apparatus to shift said steering wheels between a neutral and left and right turn positions, means connected to rotate with the wheels of the vehicle for driving the cam in timed relation to the motion rate of the wheels of the vehicle, said driving means including a normally disconnected driving connection, and a one-way clutching means for driving the cam always in one direction, said cam contour pattern being constructed to move the cam follower and the front steering wheels shifted thereby in accordance with a predetermined cycle of backing movement of the vehicle between a position substantially parallel to and removed from the curb and a rearwardly disposed position adjacent the curb, and a control means comprising a manual control shiftable between operative and inoperative positions to render said parking device operative and inoperative including connections between said manual control and said driving connection for rendering said driving connections operative and inoperative, and yieldably acting means for shifting said manual control and said parking device control to the inoperative position.

3. For use in an automotive vehicle having wheels including pivoted front steering wheels, and steering apparatus connected with said steering wheels, a vehicle curb parking device which comprises a housing shiftably supported from the vehicle for movement between operative and inoperative positions, a contoured cam supported from the housing, means connected to rotate with the wheels of the vehicle for driving the cam in timed relation to the motion rate of the wheels of the vehicle, said driving means including a coupling arranged to be connected and disconnected by the movement of said housing between operative and inoperative positions, one-way clutch means for driving the cam always in one direction a cam follower supported from the housing, and connections between said follower and the steering apparatus for shifting said steering wheels between neutral and left and right turn positions including a second coupling arranged to be connected and disconnected by said movement of the housing between said operative and in operative positions, said cam being contoured to move the cam follower and the front steering wheels shifted thereby in accordance with a predetermined cycle of backing movement of the vehicle between a position substantially parallel to and removed from the curb and a rearwardly disposed position adjacent the curb, and means under the control of the operator for rendering said parking device operative and inoperative including a manual control and connections actuated thereby for shifting said housing between said operative and inoperative positions.

4. For use in an automotive vehicle having wheels including pivoted front wheels, and steering apparatus connected with said steering wheels, a vehicle curb parking device which comprises a contoured cam supported from the vehicle, a cam follower supported from the vehicle and connected with the steering apparatus to shift said steering wheels between a neutral and left and right turn positions, means connected to rotate with the wheels of the vehicle for driving the cam in timed relation to the motion rate of the wheels of the vehicle, said driving means including a one-way clutch operative to rotate the cam only during the movement of the wheels in the reverse direction, and a normally disconnected driving connection between the cam and said wheels of the vehicle, said cam being contoured to move the cam follower and the front steering wheels shifted thereby in accordance with a predetermined cycle of backing movement of the vehicle between a position substantially parallel to and removed from the curb and a rearwardly disposed position adjacent the curb, and means for rendering said parking device operative and inoperative including a manual control, and connections between said manual control and said normally disconnected driving connection for shifting said driving connection between disconnected and connected positions.

5. For use in an automotive vehicle having wheels including pivoted front wheels, and steering apparatus connected with said steering wheels, a vehicle curb parking device which comprises a contoured cam supported from the vehicle for movement from a fixed starting position, a cam follower supported from the vehicle and connected with the steering apparatus to shift said steering wheels between a neutral and left and right turn positions, means connected to rotate with the wheels of the vehicle for driving the cam in timed relation to the motion rate of the wheels of the vehicle, said driving means including a one-way driving clutch connected with the cam operative to rotate the cam only during the movement of the wheels in the reverse direction, a starting clutch connected between said one-way clutch and the cam, spring return means for said cam, said cam being contoured to move the cam follower and the front steering wheels shifted thereby in accordance with a predetermined cycle of backing movement of the vehicle between a position substantially parallel to and removed from the curb and a rearwardly disposed position adjacent the curb, and means for rendering said parking device operative and inoperative including a manual control, and connections between said manual control and said normally disconnected driving connection for shifting said driving connection between disconnected and connected positions.

6. For use in an automotive vehicle having wheels including pivoted front steering wheels, and steering apparatus connected with said steering wheels, a vehicle curb parking device which comprises a contoured cam supported from the vehicle for movement from a fixed starting position, means connected to rotate with the wheels of the vehicle for driving the cam from said starting position in timed relation to the motion rate of said wheels of the vehicle, said driving means including a one-way driving clutch connected with the cam operative to rotate the cam only during movement of the wheels in the reverse direction, a starting clutch connected with said one-way clutch, and a coupling between said one way driving clutch and the wheels of the vehicle arranged to be connected and disconnected, spring return means for said cam, a cam follower supported from the vehicle and connections between said follower and the steering wheels for shifting said steering apparatus between neutral and left and right turn positions including a second coupling arranged to be connected and disconnected, said cam being contoured to move the cam follower and the front steering wheels shifted thereby in accordance with a predetermined cycle of backing movement of the vehicle between a position substantially parallel to and removed from the curb and a rearwardly disposed position adjacent the curb, and means under the control of the operator for rendering said parking device operative and inoperative including a manual control and a device actuated thereby for shifting said starting clutch to starting position and thereafter for engaging each of said couplings.

7. For use in an automotive vehicle having wheels including pivoted front steering wheels, and steering apparatus connected with said steering wheels, a vehicle curb parking device which comprises a housing pivotally supported from the vehicle for movement between operative and inoperative positions, a contoured cam supported from the housing for movement from a fixed starting position, means connected to rotate with the wheels of the vehicle for driving the cam from said starting position in timed relation to the motion rate of the wheels of the vehicle, said driving means including a one-way driving clutch connected with the cam operative to rotate the cam only during movement of the wheels in the reverse direction, a starting clutch connected with said one-way clutch, and a coupling between said starting clutch and said wheels of the vehicle arranged to be connected and disconnected by movement of said housing between operative and inoperative positions, spring return means for said cam, a cam follower supported from the housing, and connections between said follower and the steering apparatus for shifting said steering wheels between neutral and left and right turn positions including a second coupling arranged to be connected and disconnected by said movement of the housing between said operative and inoperative positions, said cam being contoured to move the cam follower and the front steering wheels shifted thereby in accordance with a predetermined cycle of backing movement of the vehicle between a position substantially parallel to and removed from the curb and a rearwardly disposed position adjacent the curb, and means under the control of the operator for rendering said parking device operative and inoperative including a manual control and a device actuated thereby for shifting said starting clutch to starting position and thereafter for shifting said housing to the operative position and thereby to engage each of said couplings.

References Cited in the file of this patent

UNITED STATES PATENTS

| | | |
|---|---|---|
| 1,084,392 | Brandao | Jan. 13, 1914 |
| 1,561,505 | Bellinger | Nov. 17, 1925 |
| 2,736,015 | Gilvarry et al. | Feb. 21, 1956 |